Aug. 21, 1951  F. W. LAUCK  2,565,313
CONSTRUCTION OF HOT WATER TANKS
Filed June 24, 1946
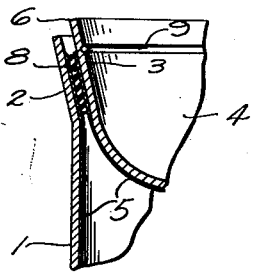
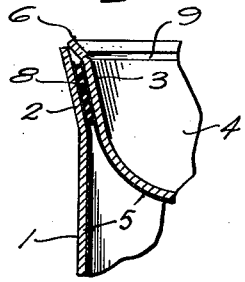
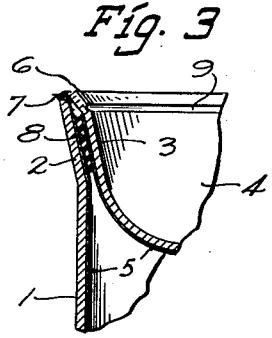
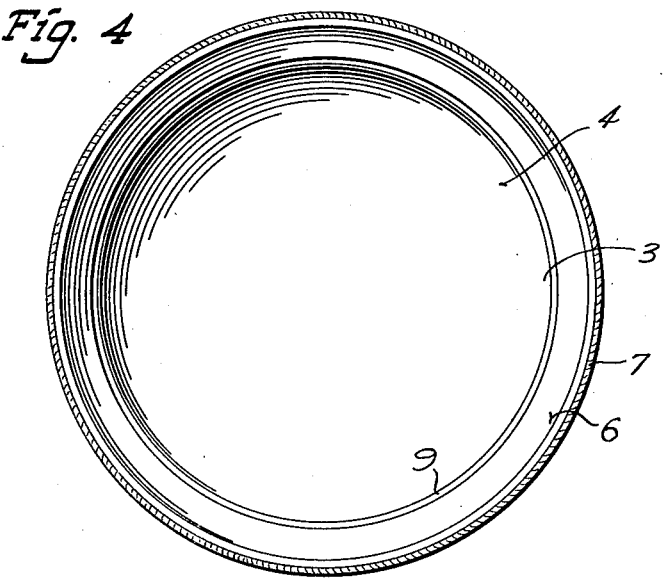
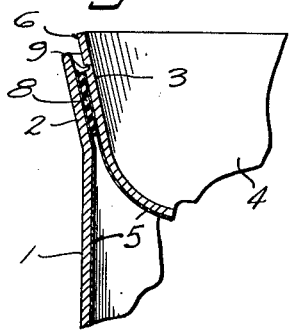
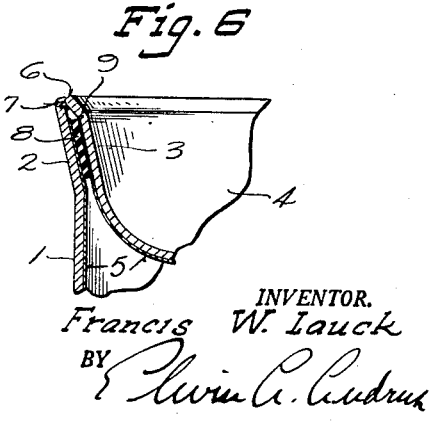
INVENTOR.
Francis W. Lauck
BY
Attorney Patented Aug. 21, 1951

2,565,313

UNITED STATES PATENT OFFICE 2,565,313

CONSTRUCTION OF HOT-WATER TANKS

Francis W. Lauck, Milwaukee, Wis., assignor to A. O. Smith Corporation, Milwaukee, Wis., a corporation of New York Application June 24, 1946, Serial No. 679,004

1 Claim. (Cl. 29—148.2)

This invention relates to the construction of hot water tanks.

Heretofore in the welding of the head-shell joint in hot water tanks the gap between the head and shell due to the gasket disposed therebetween and manufacturing tolerances, necessitated a substantial amount of weld metal to join the head and shell together with the use of high welding amperages and a consequent conduction of a substantial amount of heat into the head during the welding and building up of welding stresses in the head at the knuckle area. Such stresses may be great enough to effect crazing of the ceramic enamel lining at the knuckle area. The high amperages and the heavy weld deposit aggravate the distortion of the head due to the contraction of the weld metal during cooling.

The principal object of the present invention is to reduce the tendency of the head to contract and build up stresses in the knuckle area of the head in the welding operation.

Another object is to provide a generally flexible head that absorbs welding stresses before the same are transmitted to areas in the head where they tend to injure the enamel.

A further object is to provide a method of joining the head and shell of a tank under which less weld metal is employed.

Another object is to provide a tank in which the gap between the head and shell at the weld line is substantially eliminated.

Another object is to provide a tank in which the head tends to assume a normal shape after welding.

The invention in general is carried out by providing a circumferential notch or annular groove in one of the members slightly removed from the outer end of the other member to enable the end edge portion of the grooved member to be readily rolled onto the end edge of the other member upon assembly and to reduce the space therebetween at the circumferential weld line and thereby protect the head against undue stressing from excessive welding heats.

Other objects and advantages of the invention will appear hereinafter in connection with the following description illustrating several embodiments of the invention.

In the drawings:

Figure 1 is an enlarged detail section through the joint between the head and shell of the tank upon initial assembly;

Fig. 2 is a section similar to Figure 1 after the end portion of the head skirt has been rolled into place;

Fig. 3 is a section similar to Fig. 2 with the weld metal in place;

Fig. 4 is a top plan view of the end of a tank after assembly and welding of the head and shell;

Fig. 5 is a detail section similar to Figure 1 showing another embodiment of the invention; and Fig. 6 is a view similar to Fig. 3, of the secondary embodiment of the invention.

The tank comprises a cylindrical shell 1 which is provided with a flared end portion 2 to receive the flared circumferential skirt 3 of the end head 4 assembled within the end of the shell to close the same.

Both the shell 1 and head 4 are provided with the ceramic enamel lining 5 to protect the metal from corrosion and the enamel extends between the overlapping flared portions of the head and shell.

The skirt of the head and shell are radially spaced in their overlapping portions and the end portion 6 of skirt 3 extends beyond the end of shell 1 and engages the inner corner of the end of the shell to provide an annular seat for the circumferential weld 7 which secures the shell and head together and seals the joint therebetween.

The gasket 8 which is of asbestos or other corrosion-resistant material is disposed within the joint between the overlapping portions of the head and shell to prevent circulation of the contained fluid to the weld 7.

In order to force the end portion 6 of skirt 3 of head 4 onto the shell and to provide the flexibility in the head 4 that is desired, the annular notch or groove 9 is machined or otherwise provided or formed in one surface of head 4 slightly inside the end of the skirt. The groove 9 provides for ready bending of the end edge of the skirt outwardly after assembly of the head and shell, to effect closer proximity of the skirt and end edge of the shell at the line of weld.

The annular notch 9 may be either on the inside exposed surface of the head skirt as illustrated in Figs. 1 to 4, or on the outside surface of the skirt as illustrated in Figs. 5 and 6 and where it is confined between the head and shell.

In assembling the tank of the invention the head and shell after forming, are lined with ceramic enamel 5 and the head is then inserted within the end of the shell in spaced relation thereto with the asbestos gasket 8 interposed therebetween. The skirt 3 of the head extends beyond the end of the shell as illustrated in the drawings. The groove 9 may be provided in head 4 by machining or forming the same in the flat blank from which the head is initially formed or it may be provided in the head after the same has been curved to shape, and before enameling. Any suitable apparatus may be employed to form the groove.

After assembly of the head and shell the end portion 6 of skirt 3 is rolled or otherwise forced outwardly and downwardly onto the inner corner of the end of shell 1. The skirt extends beyond the shell slightly and an angular welding groove is formed therebetween. Thereafter the weld metal 7 is deposited by electric arc welding in the groove formed between the respective ends of the shell and head and fused to the members to secure the same together and seal the joint therebetween. Since the head and shell are in engagement at the weld line the welding is accomplished with a substantial decrease of weld metal over a construction where the head and shell are in spaced relation at the line of weld.

By notching or grooving the head as described flexibility is imparted to the head at the notch area due to the lesser cross-section of the head in that area and the head is readily forced into engagement with the shell.

With the decrease in weld metal as described less total stresses are transmitted to the head and lower amperages are necessary for welding. Another important factor reducing stresses in the head is that the latter tends to assume its original shape upon contraction of the heated weld zone. The operation by which the end of the head is forced into engagement with the shell pre-stresses the head skirt in such a manner that the rolling stresses tend to neutralize the welding stresses as the head moves to resume original shape upon cooling of the weld. Stresss in the head knuckle area are therefore reduced.

Various embodiments of the invention may be employed within the scope of the accompanying claim.

I claim:

The method of constructing a tank having a ceramic enamel lined cylindrical shell and a similarly lined end head assembled therewith with a skirt of the head extending substantially parallel to the end portion of the shell and spaced therefrom in concentric relation thereto by a gasket and with the end of the skirt extending beyond the end of the shell and having a groove in the skirt slightly removed inwardly from the end edge of the shell, which comprises, forcing the end portion of the head skirt between said groove and the end edge of the skirt outwardly into engagement with the inner corner of the end edge of the shell with said skirt end portion bridging the space between the skirt and the end of the shell to form a substantially closed groove for the reception of weld metal, and then depositing weld metal in the circumferential weld groove to join the head and shell together and seal the joint therebetween, said weld deposit being small and said grooved head skirt providing for the relief of weld stresses whereby the enamel lining is protected against damaging weld stresses.

FRANCIS W. LAUCK.

REFERENCES CITED

The following references are of record in the file of this patent:

UNITED STATES PATENTS

| Number | Name | Date |
|---|---|---|
| 943,687 | Kruse | Dec. 21, 1909 |
| 1,330,704 | Heinle | Feb. 10, 1920 |
| 2,199,528 | Sebell | May 7, 1940 |
| 2,263,021 | Uecker | Nov. 18, 1941 |
| 2,332,454 | Martin | Oct. 19, 1943 |
| 2,335,153 | Lauck | Nov. 23, 1943 |
| 2,362,909 | Lind et al. | Nov. 14, 1944 |

OTHER REFERENCES

The Weld Encyclopedia, 11th ed. pub. 1943—Welding Eng. Pub. Co.